United States Patent [19]

Ratchford et al.

[11] Patent Number: 4,646,241

[45] Date of Patent: Feb. 24, 1987

[54] SOLID-STATE FLIGHT DATA RECORDING SYSTEM

[75] Inventors: Michael Ratchford, East Granby; Richard E. Versailles, Vernon; Edward R. Brown, Farmington, all of Conn.

[73] Assignee: United Technologies Corporation, Hartford, Conn.

[21] Appl. No.: 623,055

[22] Filed: Jun. 21, 1984

[51] Int. Cl.⁴ .............................................. G06F 15/74

[52] U.S. Cl. ........................................ 364/424; 360/5; 369/21

[58] Field of Search .............. 364/424; 382/56; 360/5, 360/31; 369/21; 328/151

[56] References Cited

U.S. PATENT DOCUMENTS

| | | | |
|---|---|---|---|
| 4,183,087 | 1/1980 | Huelsman | 328/151 |
| 4,470,116 | 9/1984 | Ratchford | 364/424 |
| 4,499,548 | 2/1985 | Beebe | 382/56 |

*Primary Examiner*—Gary Chin

*Attorney, Agent, or Firm*—Dominic J. Chiantera

[57] ABSTRACT

Flight parameter data is real time sampled in successive sample frames and temporarily stored in memory for one or more sample frame intervals, the stored sample values are examined to detect extremes in parameter values with time, periodic ones of the temporarily stored sample frames are permanently stored in memory at fixed frame intervals notwithstanding the presence or absence of extreme values in the sample set data, sampled frames intermediate to the fixed frames are stored only in the presence of extreme sample values amoung selected ones of the sensed flight parameters.

11 Claims, 11 Drawing Figures

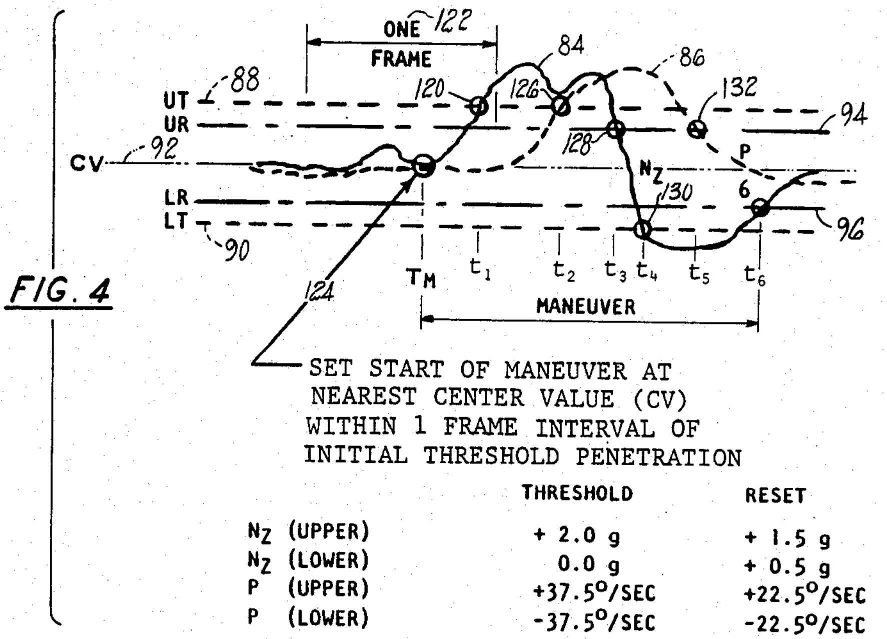
FIG. 4
| | THRESHOLD | RESET |
|---|---|---|
| $N_Z$ (UPPER) | + 2.0 g | + 1.5 g |
| $N_Z$ (LOWER) | 0.0 g | + 0.5 g |
| P (UPPER) | +37.5°/SEC | +22.5°/SEC |
| P (LOWER) | -37.5°/SEC | -22.5°/SEC |
FIG. 5
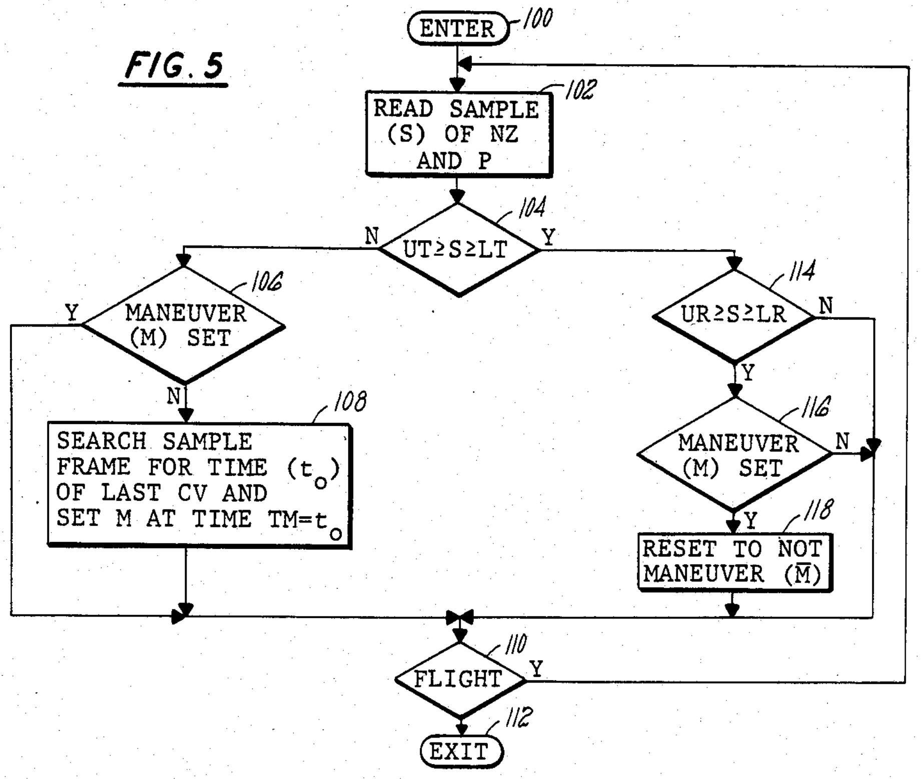

180
Parameter
Time
Window = 2 x Aperture Time
Initial Value (e.g.) Engine Idle
to Fixed Frame
182
184
186
188
190
192
194
196
198
200
202
204
206
208
208
t1
t2
t3
t4
t5
t6
t7
o = Stored Data Sample
x = Rejected Data Sample
□ = Data Sample Stored For Slope Information

SOLID-STATE FLIGHT DATA RECORDING SYSTEM

TECHNICAL FIELD

This invention relates to electronic signal processing, and more particularly to electronic signal compression and recording in avionic flight data recorders.

BACKGROUND ART

As may be known, Government and civilian aircraft fleet operators use various fleet management programs to assist in the maintenance and repair of fleet aircraft. Some programs include life history recordings of engine configuration, aircraft subsystem performance, and operating times. All of which is useful in scheduling maintenance intervals and determining mean time before failure (MTBF).

One such management program is associated with monitoring aircraft structural loads, i.e. flight maneuver stresses on the airframe. The prior art implementation of this program includes use of a continuous recording, Flight Loads Recorder (FLR), such as the MXU 553 currently installed on the military F16 A/B aircraft. The purpose is to continuously record sample values of selected flight parameters related to providing a "loads-/environment stress survey" for the F16 fleet. In this prior art FLR system the selected flight parameter sampled values are recorded in real time, in a continuous recorder, in a tape, or foil medium. The sampling is performed by a data acquisition unit (DAU) which conditions the sensed signal information for recording in an analog system, and which additionally provides analog-to-digital conversion of the sensed parameter signals for recording in a digital signal system. The sensed data is typically sampled at a 30 HZ sample rate and all samples are stored in fixed frames in the tape recorder unit, requiring extensive signal storage capacity which is feasible only in mechanical systems.

The recorded bulk data is later reduced on the ground by a transcriber/reformatter routine designed to eliminate extraneous data values and to focus on "significant event" data indicative of nonquiescent stress conditions on the aircraft. The ground data reduction process is a combination of multiple pass routines using batch process techniques. The successive pass-throughs of the bulk data provide succeeding quantitative refinements in searching for parameter value extremes, typically using "peak and valley search routines".

The downside with the prior art load recording systems and methods is, in addition to the time required to provide ground data reduction for all of the bulk data continuously recorded during flight, the problems of reliability. Mechanical problems associated with the recorder itself due to the volume of recording, such as: breakage of the tape or foil medium used to record the data, failures of the recorder tape drive, and failure or contamination of the recording heads make data storage unreliable. In many instances the data is not recorded or, if recorded, is less resolute than preferred due to noise or degradation in recording performance. The mechanical recorder failure problems are eliminated by recording the data in solid-state memory, i.e. integrated circuit memory having far higher reliability.

In order for a solid-state memory device to be used for the recording of the real time samples, the data must necessarily be first compressed to reduce data volume prior to storage. This is required due to the comparatively high cost per bit of storage in IC memory. The compression routine would necessarily be a functional equivalent of the prior art routine presently used in the ground data reduction. However, the compression routine would have to operate in situ, i.e. "on the fly" during flight, without benefit of successive pass-throughs as with ground reduction routines. The compression algorithms would, therefore, have to be highly reliable if the compressed data integrity can be ensured to provide accurate "reconstructed" stress profiles.

DISCLOSURE OF INVENTION

An object of the present invention is to provide a digital flight data recording system (DFDRS) for storing the compressed real time samples of aircraft structural load flight parameters in solid-state memory. Another object of the present invention is to provide such a DFDRS with improved compressed signal storage reliability, and with resolute data readout.

According to one aspect of the invention, selected flight parameter data is real time sampled in successive sample sets and temporarily stored in memory for one or more sample set intervals, the stored sample values are examined to detect extremes in parameter values with time, periodic ones of the temporarily stored sample frames are permanently stored in memory at fixed frame intervals notwithstanding the presence or absence of extreme values in the sample set data, sampled frames intermediate to the fixed frames are stored only in the presence of extreme sample values among selected ones of the sensed flight parameters. In further accord with this aspect of the invention, the sampled flight parameters are associated with aircraft load stresses occurring during aircraft flight maneuvers, which vary between extreme limits in the presence of such maneuver, the DFDRS data compression algorithm providing discriminate detection of extreme load data peak and valley signal excursions associated with significant aircraft maneuvers so as to eliminate all lesser value, extremes prior to recording in memory. In still further accord with this aspect of the invention, the sampled load data signal compression process includes a first signal compression step which monitors maneuver dependent flight parameters for value exceedance beyond selected threshold limits to provide a signal indication of the presence of an aircraft maneuver, this first signal compression algorithm discarding all sample data intermediate to the fixed frame samples, in the absence of a detected maneuver, and a second compression step comprising the detection of extreme peak and valley signal excursions of reference load parameters only in the presence of the maneuver signal indication, for storing all sampled load parameters only in the presence of these extremes.

In accordance with a second aspect of the present invention, sensed flight data other than load data is similarly sampled, compressed, and stored in common memory with the load compressed data, each in a memory map region defined by first and second map boundary addresses, the load compressed data being written into successive mapped address locations beginning with the first boundary address and the nonloads compressed data being written into successive mapped address locations beginning with the second boundary address,each capable of real time readout beginning with the associated map boundary address, whereby each type of compressed data is recorded at a frequency established by the particular compression algorithm in sequence from the two memory map extremes toward a central, common memory map region. In still further accord with the present invention, the compressed data is stored in nonvolatile solid-state memory.

The digital flight data recording system of the present invention provides accurate real time compression of sensed loads data, in situ during flight, and stores the compressed data in solid-state memory. This allows direct readout of the compressed data for reconstructive analysis, without further signal reduction. The solid-state memory preserves the data in a nonvolatile medium, not subject to failure and subject to in-flight testing through known built-in test (BIT) routines. All of which provides for improved accuracy and system reliability.

In addition, the recording of nonloads data together with loads data in a common nonvolatile memory requires a priority allocation between the compressed data types in the event of extended flight time, or high volume data recording. In the present invention the recording of each type of compressed data at the opposite extremes of a common memory map region allows the compressed data to compete for available space based on the frequency of usage, or application requirements. If the two types merge in the presence of extreme data recording requirements, the most recent data of each overrides it's former data entry.

These and other objects, features, and advantages of the present invention will become more apparent in light of the following detailed description of a best mode embodiment thereof, as illustrated in the accompanying Drawing.

BRIEF DESCRIPTION OF THE DRAWING

FIG. 4 is an illustrative waveform used in the description of one aspect of the present invention as used in the system of FIG. 1;

FIG. 5 is a flowchart diagram illustrating the operation of that aspect of the present invention illustrated in FIG. 4;

BEST MODE FOR CARRYING OUT THE INVENTION

Figure 2:
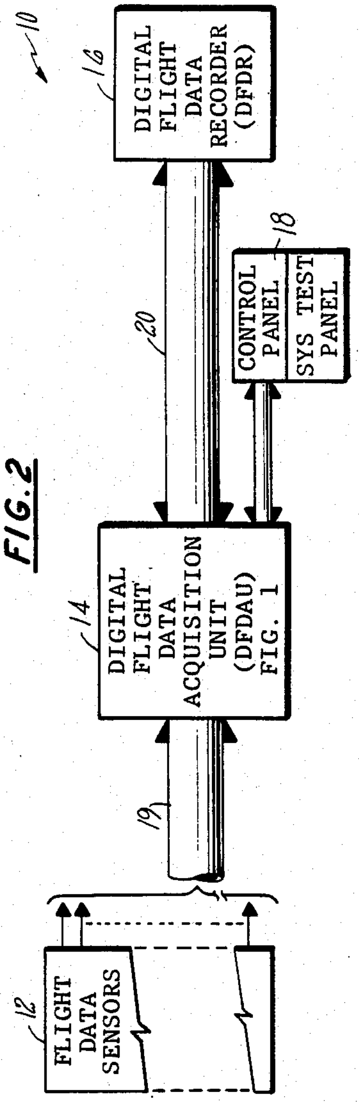
FIG. 2 is a simplified block diagram illustration of the DFDRS of FIG. 1.

FIG. 2 is a simplified block diagram of a digital flight data recording system (DFDRS) 10, in which the present invention may be used. The DFDRS receives sensed flight parameter information from flight data sensors 12, through a digital flight data acquisition unit (DFDAU) 14. A crash survivable digital flight data recorder (DFDR) 16 records some selected ones, or all of the flight parameters. The parameters to be recorded are specified by the airframe manufacturer. A cockpit mounted control system/test panel 18 provides operator interface to the system. This type of system can be installed on commercial aircraft to satisfy the FAA mandatory flight data recording requirements, or it can be used in a multitude of military aircraft applications.

The flight data sensors 12 include various signal types and signal sources. Analog, discrete, and digital input signals are provided from the sensors through lines 19 to the DFDAU. In the simplified FIG. 2 illustration the data sensors may also include an avionic data bus, such as the MIL-STD-1553, which provides conditioned signal data from other aircraft systems. All of which is well-known in the art.

Figure 3A:
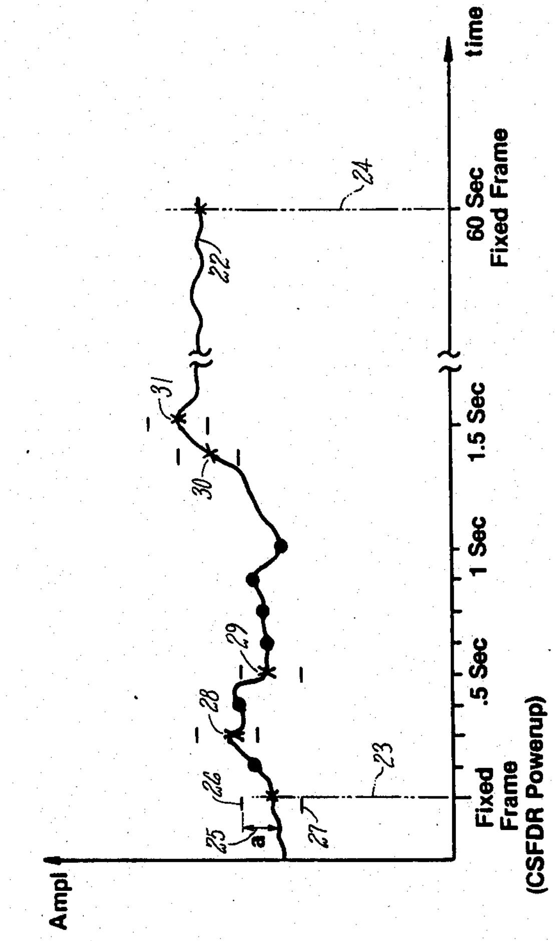
FIGS. 3A-3C are an illustration of a signal data format as used in the description of the present invention.

The DFDAU conditions the input signal data; converting each to a digital signal format compatible with the DFDRS. The "bulk data" conditioned signals are then compressed into a series combination of periodic fixed frames, occurring at a selected interval (typically 60 seconds), and variable frames which are recorded intermediate to the fixed frames in response to one or more sensed parameters exceeding the tolerance (aperture) value since the last fixed frame. FIG. 3A illustrates the operation of the DFDAU in compressing the sensed data for an exemplary parameter time waveform 22; amplitude versus time. The parameter samples are recorded in fixed frames 23, 24 shown to occur at 60 second intervals in the illustrative example. The succeeding parameter is not recorded in the interval between fixed fram its sampled value exceeds a tolerance, i.e. aperture value (a) 25 established around the last fixed frame sampled. In FIG. 3A the parameter aperture value defines an upper limit 26 and lower limit 27 for the next sample. If the value does exceed the aperture it is recorded in the variable frame intermediate to the fixed frames. Each variable frame includes all parameter exceedances (outside the aperture limit) occurring in a one second interval. Typically this includes multiple samples as shown in FIG. 3 with seven samples. Of the seven samples 28, 29 are out of limit and are recorded in a variable frame. Similarly, in the next one second interval, samples 30, 31 exceed the aperture value and are recorded in a second variable frame.

Figure 3B:
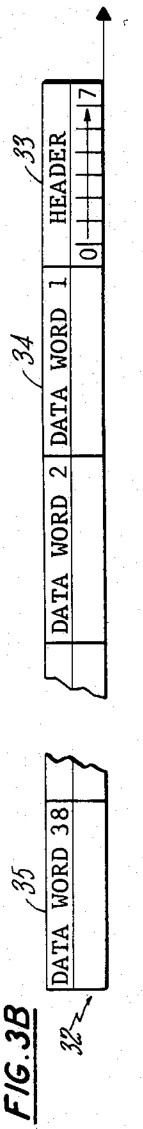
Figure 3C:
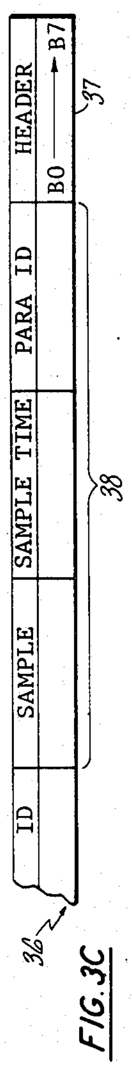

FIG. 3B illustrates the fixed frame format 32, having thirty-nine bytes of data. The first byte 33 is a header in which seven bits (B0-B6) define the samples real time, and the eighth bit (B7) identifies the frame as fixed (1) or variable (0). The second through thirty-nine bytes 34-35 are thirty-eight data words. FIG. 3C illustrates the variable frame 36, which is variable in length depending on the number of aperture exceeding data samples. As shown, the variable frame includes the header 37 and three bytes 38 for each entry, identifying: the parameter, the time since the beginning of the variable frame, and the parameter value.

Figure 1:
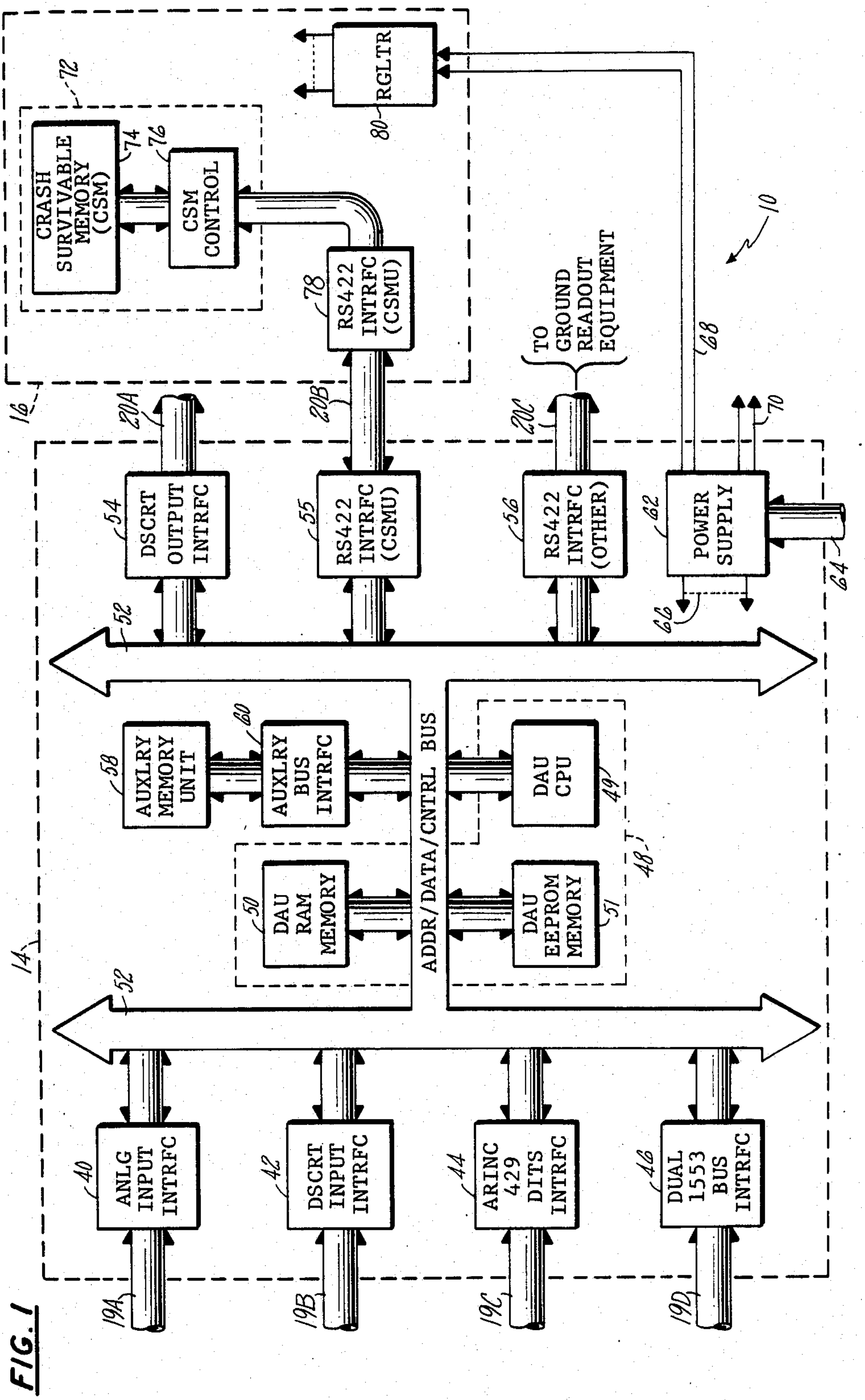
FIG. 1 is a system block diagram illustration of a digital flight data recording system (DFDRS) in which the present invention may be used.

Referring now to FIG. 1, in a detailed system block diagram of the DFDRS 10, the signal inputs on lines 19A-19D from signal source 12, includes sensed flight data signals from different sensor groups or data sources of the aircraft (e.g. air, data, computer, flight management system, etc.). These different inputs include those mandated for recording by the air frame manufacturer, i.e. mandatory recording flight data parameters and nonmandatory recording parameters, grouped according to signal type. An exemplary list of parameters include:

Discrete signal inputs, including:

(1) man TF select
(2) auto TF select
(3) category III select
(4) landing gear down command
(5) valid weapon release
(6) weight on wheels (WOW)
Analog sense signals, including:
(7) pitch rate (Q)
(8) yaw rate (R)
(9) roll rate (P)
(10) roll acceleration ($\dot{P}$)
(11) lateral acceleration
(12) normal acceleration
(13) longitudinal acceleration
(14) forward fuel quantity
(15) aft fuel quantity
(16) rudder position
(17) right horizontal tail position
(18) left horizontal tail position
(19) vertical tail position
(20) left flaperon position
(21) right flaperon position
Digital signal inputs (provided in the ARINC 429 BRZ or MIL-STD-1553 format) including:
(22) aircraft gross weight
(23) total stores weight
(24) pressure altitude
(25) baro ref altitude
(26) mach number
(27) calibrated airspeed
(28) true angle of attack
(29) true freestream air temperature.

The sensor and avionic bus input signals are presented through the lines 19A-19D to different signal-type interfaces within the DFDAU 14. Typically the interfaces include an analog input interface 40, a discrete signal input interface 42, and ARINC 429 digital information transfer system (DITS) input interface 44 and/or a dual MIL-STD-1553 bus interface 46. The bus interface allows the DFDAU to receive data which is already available on the 1553 avionics bus. The DFDAU reads selected data from the bus as required to support the various DFDRS recording functions. The specific type of signal associated with each parameter will vary from application to application.

Each interface converts the input data into a digital format compatible with the DFDAU signal processor 48. The signal processor includes a known type CPU 49, such as a ZILOG Model Z8002 microprocessor, and local RAM and ROM memories 50, 51. If deemed necessary, the ROM may be nonvolatile program store memory, such as EEPROM.

The analog interface converts ANALOG signals into the DFDARS compatible digital format. The analog interface is a known type universal interface, such as that disclosed and claimed in U.S. Pat. No. 4,340,881, of common assignee herewith. These input signals include both DC absolute value signals, DC ratio signals, AC ratio signals, and AC synchro inputs, all of which are brought into the interface through a three wire format. The analog interface receives AC and DC sensed parameter signals and conditions them to selected DC voltage ranges, typically ±10 VDC. The conditioned signals are multiplexed to an analog-to-digital (A/D) converter.

The discrete signal interface is also a known type. It conditions and scales the input discrete signals into the processor compatible digital format. Similarly, the ARINC 429 DITS interface 44 is a known type, such as that disclosed in U.S. Pat. No. 4,298,959 to Sundermeyer et al; also of common assignee herewith.

The signal processor 48 accesses each of the input interfaces output signals via the system ADDRESS/DATA/CONTROL BUS 52 using software techniques and methods known to those skilled in the art of software programming. Each interface stores the conditioned, formatted output signal information in a direct memory access (DMA) within the interface, for later retrieval by the processor. The DFDAU output interfaces include a discrete signal output interface 54, and two communication interfaces 55, 56. The discrete interface circuitry is known, and includes line driver circuitry for transmitting the discrete output signals through lines 20A to the other utilization circuitry. The interfaces 55, 56 are serial communication interfaces, preferably EIA Standard RS-422 standard communication interfaces with differential data transmission. This transmission uses a protocol such as that described in FIG. 3. The serial interface 55 provides DFDAU to DFDR communications through lines 20B and the interface 56 communicates through lines 20C with other utilization circuitry and optional DFDARS control panel 18 (FIG. 2).

The DFDAU includes supplemental memory storage in the form of an auxiliary memory unit (AMU) 58 connected to the system bus 52 through an auxiliary bus interface 60. The AMU is preferably a nonvolatile memory, such as EEPROM, and provides storage for sensed flight data parameters which need not be recorded. in the crash survivable memory within the DFDR 16. These are nonmandatory recording parameters, and typically include data related to aircraft structural integrity (i.e. "structural load data"), or engine performance. When used in conjunction with quantitative models of aircraft load or engine performance profiles, they provide a quantitative diagnostics tool for determining malfunctions and for prognosis to determine performance trends. The AMU stored data is available to ground readout equipment (GRE) through the RS-422 interface 56. The DFDAU power supply 62 accepts +28 VDC power from the aircraft VDC bus on lines 64 and distributes preconditioned power to the DFDR on lines 68 and to a number of dedicated DFDAU sensors on lines 70.

The DFDR 16 provides bulk memory storage of mandatory recording parameters in a crash survivable memory unit (CSMU) 72. The CSMU is an armored housing which protects an internal crash survivable memory (CSM) 74 and CSM control 76 from penetration during crash. The DFDR serial communications interface 78, an RS-422 interface, and a DFDR voltage regulator 80 are located outside the CSMU. The DFDR is controlled by the CSM control 76, which includes a known type microprocessor, such as the INTEL Model 8051. The control on command from the DAU, controls the writing and reading of data to and from the CSM 74. It also transmits CSM stored data through interface 78 to the DAU or the GRE (via the DAU) and performs built-in test routines.

At power-up the CSM control performs a confidence test of the CSM memory by reading each data block and performing a cyclic redundancy check (CRC) on each stored FRAME. The control sets a flag bit in a status register included within the control circuitry for any faults found in the confidence test; the contents of the status register are transmitted to the DAU or GRE on command. In addition, CSM control performs a "read-after-write test" after each FRAME written to the CSM. If a fault is found which cannot be cleared with a rewrite of the data, the faulted memory location is mapped out of the CSM memory space. The fault is, therefore, transparent to DFDR operation.

The CSM control determines where DAU data is to be stored in the CSM. It is responsible for protecting data associated with special events, i.e. "protected data". The control prevents the protected data from being overwritten with more recent data prior to read-out by the GRE. This includes baseline data used to calibrate the real time parameter values stored in the CSM. When a DAU command is received to store data the control writes a block of data to the appropriate CSM location, together with a block address. The FRAMES are typically written once per second. If the data is protected the control writes START and END addresses for each protected block into a protected data memory map. The protected blocks will not be over-written until a command to overwrite is received from the DAU.

In the operation of the DFDARS the input sensed parameters are real time sampled in successive FRAMES at each interface. The real time samples are stored for one full FRAME and compressed prior to storage in memory. The compression process and particular memory is dependent on the category with which the data is associated. In an exemplary embodiment of the FIG. 1 DFDARS the data is classed in any of four different categories, e.g. Type I through Type IV. Each category is associated with a different objective, and any sensed parameter may be classified in more than one of these categories.

The Type I data is that collected for flight parameters mandated as necessary to support mishap (crash) investigations. The Type I data is compressed using known techniques, such as that, disclosed in U.S. Pat. No. 4,409,670 to Herndon et al which is of common assignee herewith, and stored in the DFDR crash protected CSM 74.

The Type II category data covers those sensed parameters related to usage, and are monitored to determine aircraft exceedances. This is provided for in the aircraft "tracking algorithms" which are deterministic models of aircraft flight profiles in which the flight profile is divided into a plurality of stations. The Type II sensed parameters are compared at each station to the expected value of each at the corresponding station in the flight profile. These exceedances represent usage; the sensing of these periodic use functions is analogous to a watchdog timer which keeps track of the number of uses and compares them to a maximum value calculated on the basis of a statistical mean time before failure. These periodic functions include: number of landings, number of flights, total flight time, etc.

The exceedances detected for the Type II parameters are stored in the DAU EEPROM 51. Since the actual exceedences occur at a low frequency the exceedance data total in the DAU EEPROM is small. Further data compression is not required.

The Type III category parameters are those associated with determination of stress, i.e. "loads", on the aircraft itself. The actual stress values are calculated from the emperical Type III data by the DAU processor 48 under program control. The load calculation routines are not part of the present invention. They comprise techniques well-known to those skilled in the art of computer programming, involving the use of known relationships between the sensed parameter and the ultimate desired calculated load value.

The Type IV category information of the FIG. 1 DFDARS embodiment relates to engine usage monitoring programs. Typically these are life tracking data bases in which the engine's actual operating profile is monitored. The parameters include: power level angle (PLA), core rotor speed (N2), fan rotor speed (N1), fan turbine inlet temperature (FTIT). They also include parameters common to other categories, such as vertical acceleration (NZ) and longitudinal acceleration (NX). The Type III and IV data is stored in the AMU 58 for later retrieval by the ground readout equipment.

Since the Type I data must be capable of reconstructing aircraft performance following a mishap, the mandated sensed parameters must be sensed and stored in real time; subject to data compression techniques which preserve the ability to reconstruct the real time sensed values. This is a continuous function which must be provided through one or more flight profiles. The known compression techniques involve a combination of: (i) periodic sample FRAMES and (ii) a Zero Order Floating Aperture (ZOFA) data compression algorithm. The periodic sample FRAMES are interval "snapshots" of all Type I parameters sensed at a given time, i.e. "time hack". The ZOFA compression produces variable frames in which the data content and length are variable; a variable frame is recorded only if a parameter has changed by more than a selected aperture value from the preceeding recorded value. The variable frames are normally one second intervals (periods) whenever there is a need to record at least one parameter. If no parameter exceeds its aperture value within a present one second period, no variable frame is recorded for that period. If a parameter which is sampled more than once during a one second period exceeds its aperture more than once during a one second period, all aperture exceeding samples are recorded in the variable frame for that period. The variable frame, therefore, is variable in length as well as data content.

When a parameter is recorded in either variable or fixed frame, its subsequent sensed value must change by more than the aperture value before it is again recorded in a variable frame. The original data is reconstructed using a zero order approximation algorithm in which a current value is held until a new recorded value is encountered. This produces reconstructed data with a staircase appearance.

The present invention relates to real time compression and recording of Type III and Type IV data; each covered by a different aspect of the invention. Each type of compressed data is recorded in real time sequence, in solid-state memory. In the FIG. 1 DFDARS embodiment this occurs in the AMU 58; preferably nonvolatile bulk memory, such as EEPROM. The stored data.is available for real time reconstruction, in situ, on request. For Type III data this is in contrast to the prior art methods of continuous real time recording of all Type III parameters in toto, on tape, requiring subsequent ground analysis for "significant event" data.

As known, significant Type III data occurs during stressed operation of the aircraft. This, in turn, occurs during aircraft maneuvering. In the present invention all Type III parameter values are real time sampled in each sample frame and stored temporarily in memory. In the FIG. 1 DFDARS, the DAU RAM 50 is used for temporary storage of each sample set; typically for one full sample frame interval (Ts). The sampling frequency is selectable, based on application, and in the present embodiment is assumed to be one second. The temporarily stored data is then subjected to a two step compression technique. First, quiescent flight data is removed by a first compression routine which detects aircraft maneuvers. This first step is a preliminary compression technique, and is optional. All data samples occurring in the absence of a maneuver are discarded. Data samples occurring in the presence of a maneuver are then subjected to a second compression routine which discriminates between maneuver extrema and further discards all data samples occurring outside of select extrema limits. The twice compressed Type III data may then be further compressed using the ZOFA compression algorithm prior to storage.

To detect the presence of a maneuver one or more selected flight parameters which are inherently associated with maneuver activity are continuously sampled more than once per sample frame, from lift-off to touch-down. "Vertical load factor" ($N_Z$) and "roll rate" (P) are exemplary. Each frame sample set is temporarily stored and the values examined for extremes. An in-flight maneuver is identified when sampled values of either selected parameter is outside of a specified band. FIG. 4 illustrates the process. Waveform 84 represents actual $N_Z$ and waveforms 86 represents actual P. A tolerance band is defined for each parameter by upper threshold (UT) and lower threshold (LT) limits 88, 90 established about expected nonmaneuver quiescent parameter values 92, i.e. "center values" (CV). Upper reset (UR) and lower reset (LR) values 94, 96, within the threshold limits, defined "reentry" of the selected parameter sensed values within the band. FIG. 4 lists typical values for the threshold and reset values.

FIG. 5 is a simplified flowchart diagram illustrating a typical subroutine performed by the DFDAU processor to detect a maneuver. The processor enters at 100 and instructions 102 read the most recent sample (S) of each selected flight parameter ($N_Z$, P). Decision 104 determines if each parameter is within the band. If NO, decision 106 determines if a maneuver (M) flag bit is set. If M is not set instructions 108 search the stored sample set to identify the time (to) of the last center value (CV) and sets the M flag bit with an associated START OF MANEUVER TIME (TM). Following instructions 108, or a YES to decision 106, decision 110 determines aircraft flight status (between "lift-off" and touch-down"). If YES, the processor branches back to 102; if NO, the processor exits at 112.

Following a YES to decision 104, decision 114 determines if each parameter sample value is within the upper and lower reset values. If YES, decision 116 determines if the M bit is set and if it is instructions 118 reset to NOT MANEUVER ($\overline{M}$). Following instructions 118 or a NO to decisions 114, 116, decision 110 determines flight, and the processor either exits at 112 or branches back to 102.

FIG. 4 provides a visual demonstration of the process. At sample 120 (time $t_1$) $N_Z$ exceeds the upper threshold for the first time within the frame 122. The processor searches for the last CV sample 124 and sets START OF MANEUVER $T_M$. At time $t_2{}^P$ sample 126 exceeds the upper threshold, and remains above the threshold limit even though $N_Z$ sample 128 drops to the upper reset value at $t_3$. At $t_4 N_Z$ sample 130 reaches the lower threshold and remains outside the band while the $t_5$ P sample 132 reaches the upper reset value. The end of maneuver does not occur until after the $N_Z$ sample 134 at $t_6$, at which time the NOT MANEUVER ($\overline{M}$) state is established.

When a maneuver is detected by the setting of the START OF MANEUVER M bit an eight state algorithm causes the processor to examine the extreme excursions of a second select group of flight parameters. This second set, which is selectable based on the particular application or aircraft, includes, in the exemplary embodiment, three sensed and three calculated parameters. The sensed parameters may include: Vertical Load Factor ($N_Z$), Roll Rate (P) and Roll Acceleration ($\dot{P}$). The calculated parameters used in conjunction are: the Left and Right Horizontal Tail Bending Moments (HTBL, HTBR), and the Vertical Tail Bending Moment (VTB).

Figure 6:
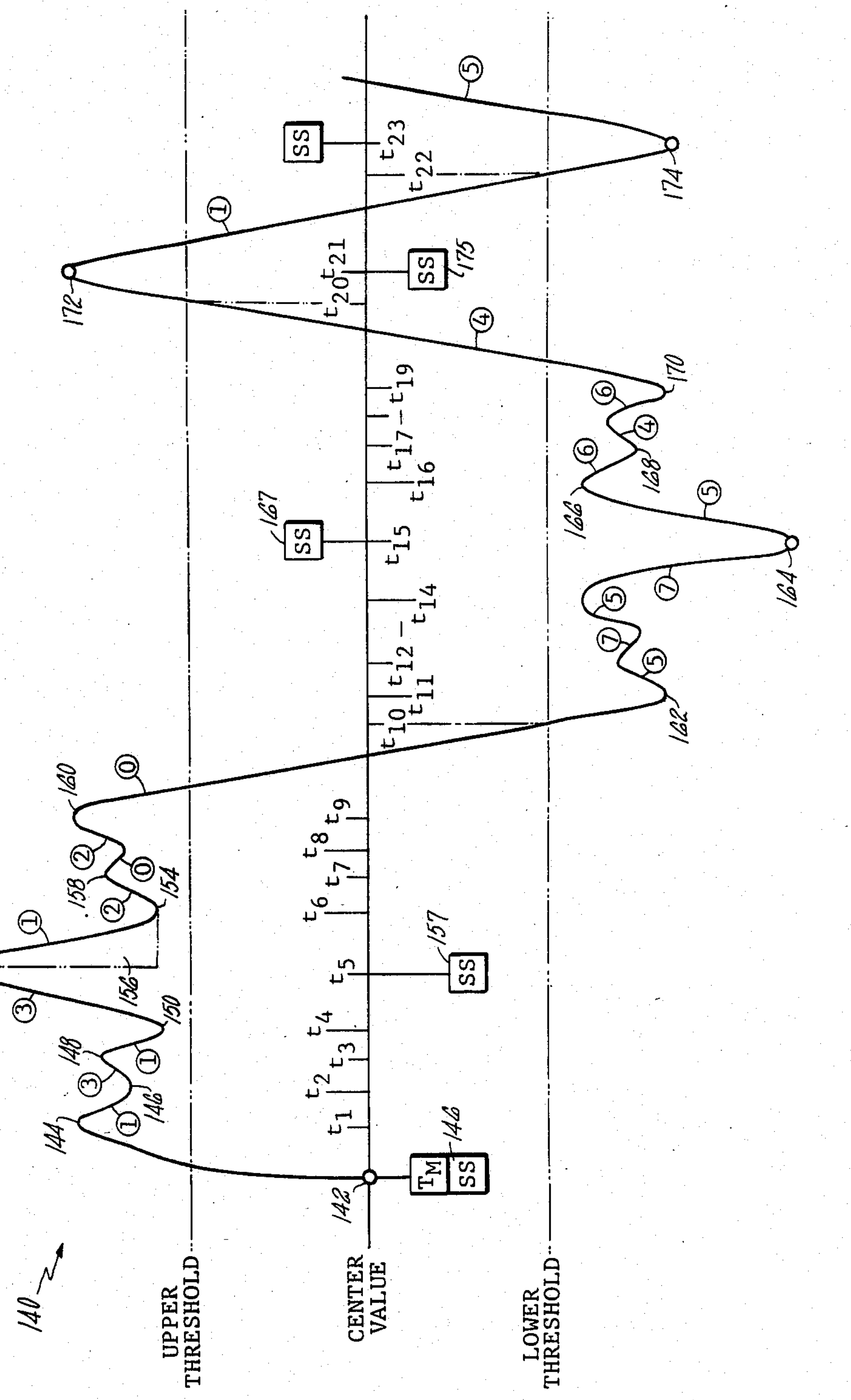
FIG. 6 is an illustrative waveform used in the description of another aspect of the present invention, as used in the system of FIG. 1.

The eight state algorithm is tabulated in APPENDIX I and described hereinafter with respect to a typical time history of one of the second set parameters, as illustrated in FIG. 6. The following defined terms are used in the description of operation.

Snapshot—a sample set of all Type III sensed and calculated parameters.

Time Hack—real time value at which a snapshot is taken.

Fall—the difference value between a parameter's value and a succeeding valley value.

Rise—the difference value between a parameter's valley value and a succeeding peak value.

Gate Value—a threshold difference value for each parameter for comparison to the Fall or Rise.

Potential Valley—the maximum value of a parameter in a time frame between a Potential Peak and a present sampled value.

Threshold—a selected tolerance value for a parameter about a defined center value; both upper and lower threshold.

Incremental Peak—the absolute value between a peak value and the center value.

Peak Criteria—the prerequisite conditions for recording a peak snapshot which includes:
(i) Rise greater than gate value;
(ii) Rise greater than ½ incremental peak; and
(iii) Peak value exceeds threshold.

Valley Criteria—the prerequisite conditions for recording a valley snapshot, which include:
(i) Fall greater than gate value; and
(ii) Fall greater than ½ incremental peak;

Potential Peak—the maximum value of a parameter in a time frame between a Potential Valley and a present sampled value.

In FIG. 6, waveform 140 is illustrative of a typical time history of a second set parameter. The exact parameter is immaterial since each are examined with the eight state algorithm simultaneously, in parallel. The circled numbers (0—7) represent the instant STATE of the algorithm between the parameter peak and valley extremes.

Figure 7:
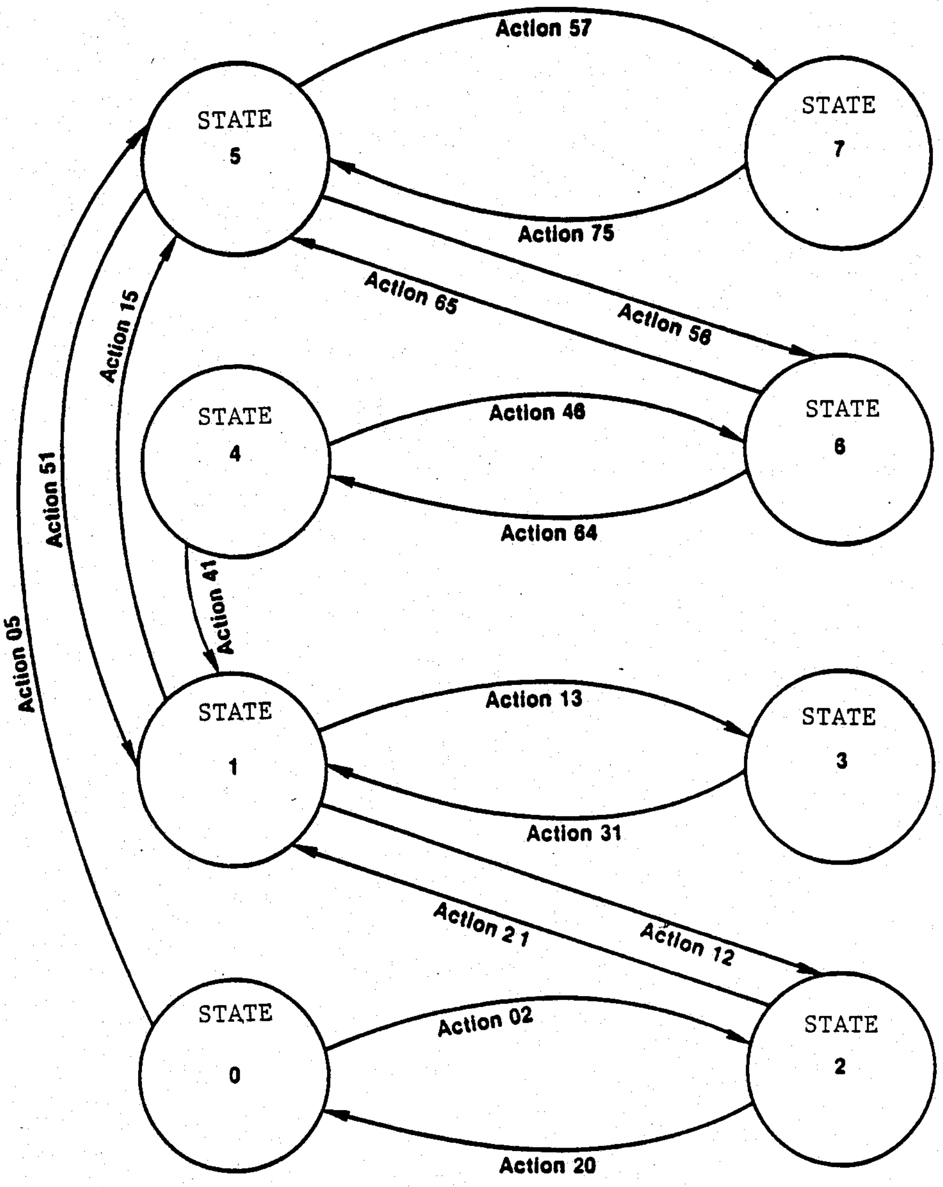
FIG. 7 is a state diagram illustrating that aspect of the present invention illustrated in FIG. 6.

FIG. 7 is a state diagram of the algorithm showing the transition between the eight states, and supplements the Appendix I in teaching the operation of the algorithm.

Referring simultaneously to the Appendix I, and to FIGS. 6, 7, the setting of the START OF MANEUVER M bit 142 at time $t_M$ occurs in STATE 2. STATE 2 is defined (Appendix I) as an upper threshold search in which the algorithm is looking for a "better" valley and detects a peak excursion. This occurs at 144. The peak 144 transition from the $T_M$ value 142 is assumed to satisfy the Peak Criteria. As such STATE 2, Action 21 stores the $T_M$ time hack and snapshot 146 (SS) for the "potential valley" 142, i.e. the START OF MANEUVER value which was set at initialization. The peak 144 then becomes the new potential peak and new potential valley, concurrently, until subsequent sampled values alter its status. Following Action 21 the algorithm shifts to STATE 1.

In STATE 1 the DFDAU processor is searching for a "better peak", but a valley 146 is detected at $t_2$. This valley does not exceed the lower threshold and does not meet the Valley Criteria, resulting in Action 13. Since Valley 146 is less than (lower in magnitude) than potential valley 144 it becomes the new potential valley. The processor next transitions to STATE 3.

STATE 3 is an upper threshold peak search. The peak 148 at $t_4$ is less than the potential peak 144 and there is no change in status. The processor transitions to STATE 1 searching for a better peak, detecting valley 150, which is less than potential valley 146. It becomes the new potential valley under Action 13, which then transitions to a STATE 3 search for an upper threshold peak. The peak 152 is greater than potential peak 144, and becomes the new potential peak; after which the processor transitions to STATE 1. Valley 154 (at time $t_6$) has a Fall 156 greater than the selected threshold. The valley meets the Valley Criteria, initiating Action 12, which stores the time hack and snapshot 157 associated with the potential peak 152. The valley 154 becomes the concurrent potential peak and potential valley.

The peak and valley detection continues for the $t_7$–$t_9$ peak and valley in the STATE shown. Peaks 158, 160 become successive potential peaks, but neither satisfy the Peak Criteria. Following the $t_9$ peak 160 the processor is in STATE 0 searching for upper threshold valley. However, the parameter valley decreases below the lower threshold time at $t_{10}$, so that the upper threshold potential valley 162 at time $t_{11}$ is also a lower threshold potential peak, i.e. negative peak. The processor enters lower threshold detection and the present potential valley (162) and potential peak (160) exchange identities, such that 162 is the new potential peak and 160 is the new potential valley. The processor transitions to STATE 5.

The $t_{12}$–$t_{14}$ times are inconsequential. Peak 164 at $t_{15}$ is more negative than potential peak 162, and becomes the new potential peak. The valley 166 meets the Valley Criteria resulting in the storing of the time hack and snapshot 167 for the potential peak 164 and setting the valley 166 as the concurrent new potential valley and new potential peak. Succeeding peaks 168, 170 become succeeding potential values, and the processor enters STATE 4 following the potential peak sample $t_{19}$. STATE 4 is a lower threshold valley search. The parameter value exceeds the upper threshold at time $t_{20}$ in detecting lower threshold valley 172 (upper threshold peak). This results in the state change from lower threshold to upper threshold detection. The potential valley 172 for the lower threshold now becomes the potential peak for the upper threshold, and the lower threshold potential peak 170 becomes the upper threshold potential valley. This takes place in Action 41, after which the routine transitions to STATE 1 looking for a better upper threshold peak. Instead, the parameter value again decreases below the lower threshold at $t_{22}$ and reaches the extreme upper threshold valley 174 at $t_{23}$. The valley 174 satisifies the Valley Criteria, such that the time hack and snapshot 175 for the upper threshold potential peak 172 is stored under Action 15. Since lower threshold detection has now been entered, the upper threshold potential valley 174 becomes the lower threshold potential peak and the upper threshold potential peak 172 becomes the lower threshold potential valley.

Each snapshot taken is a sample set of all the Type III (parameters), which are temporarily stored in the DAU RAM 50. Taking the snapshot results in that real time data sample set being transferred to the AMU 58 for permanent storage pending later ground retrieval. Each of the snapshots are the nucleus for reconstructing the field time data on the ground. As shown in FIG. 6 each of the extreme data points are stored; both positive (152, 172) and negative (164, 174) extremes. The minor peak and valley excursions between are of no consequence since they represent less severe load stress than the higher peak values. Of the total 25 parameter value extremes, i.e. peak and valley points, only the five more extreme points are stored, the rest are discarded.

The eight state algorithm requires less than 2 K bytes of RAM for temporary data storage. The algorithm operates in real time and is capable of accurately duplicating reconstructive data patterns as that provided by ground based computers, without any loss of data. The eight state detector provides signal compression ratios on the order of 100 to 1.

The time hack snapshots from the peak and valley compression algorithm include data samples from all Type III parameters. However, a maneuver does not necessarily result in a value change for all of the snapshot parameters. Some remain relatively constant, depending on the type maneuver. As such the snapshot data may itself be compressed by applying ZOFA compression, as described hereinbefore, to each sample of the snapshot. The use of "follow-on" ZOFA compression may provide as much as an additional twenty percent compression.

Figure 8:
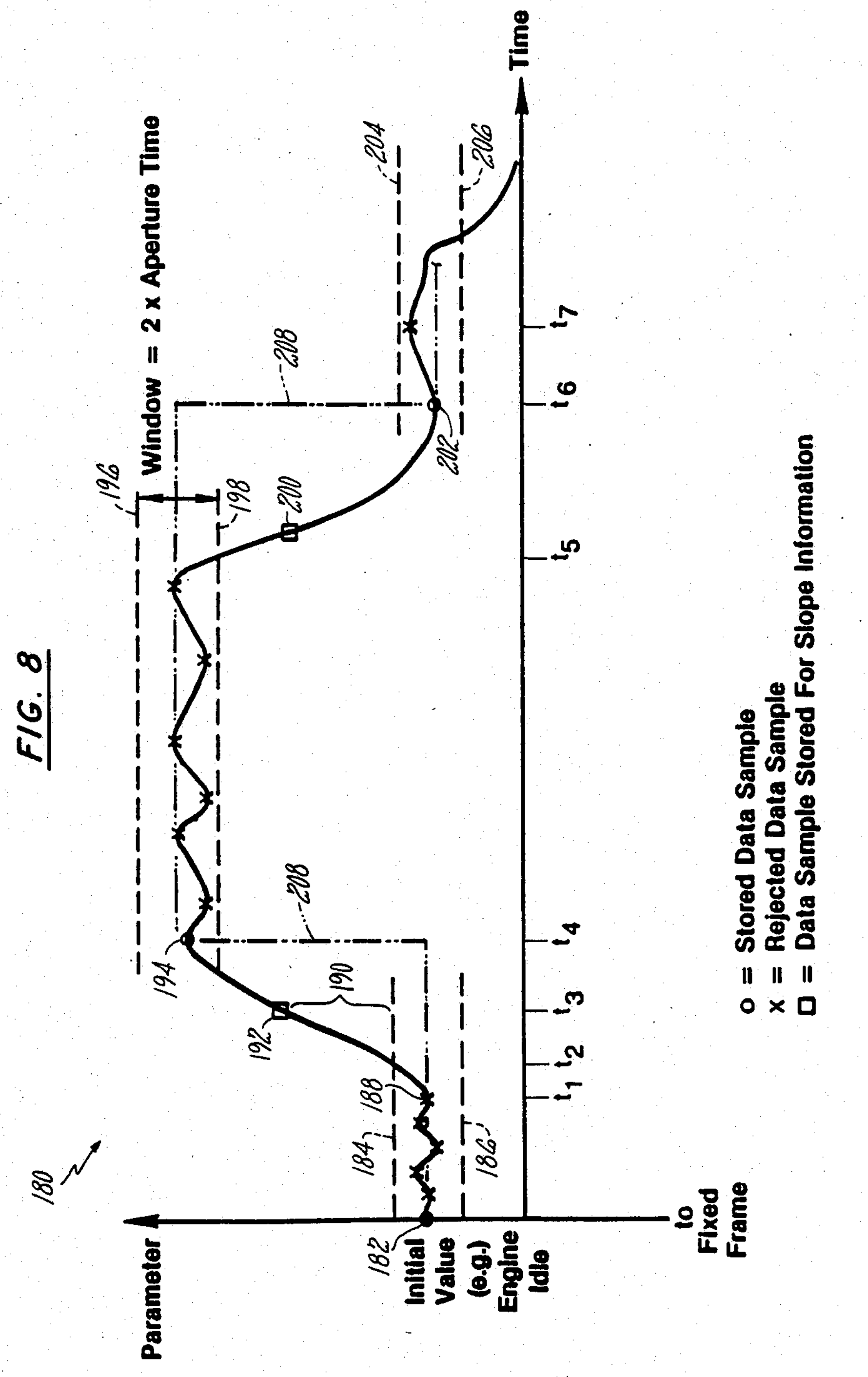
FIG. 8 is an illustrative waveform used in the description of operation of still another aspect of the present invention.

In yet another aspect of the present invention Type IV sensed engine data is compressed using a similar peak and valley signal compression routine in combination with a ZOFA compression algorithm. Each complimenting the other provide an overall signal compression ratio which is less than those used in the prior art data recording system. FIG. 8 is an illustrative waveform 180 of the time history of an exemplary Type IV parameter. The symbols used to denote stored and rejected data samples in the waveform are listed in the accompanying legend. The data samples are stored in fixed and intermediate variable frames, as described hereinbefore with respect to FIG. 2.

Referring to FIG. 8, sample 182 at $t_0$ is assumed to be a fixed frame sample, and the ZOFA compression routine fixes an aperture window with upper and lower thresholds 184, 186 centered on the 182 stored sample value. The fixed frame samples are recorded at periodic intervals, typically every 60 seconds. However, intermediate samples must meet a two-step criteria for intermediate frame storage. Once a parameter value has been recorded in a fixed frame it must change value by more than the aperture tolerance before being "considered" for variable frame storage. Whether or not it is stored depends on if the sampled aperture exceeding value is a peak or valley, i.e. an extreme value. This differs from the typical ZOFA compression technique which stores any intermediate sample that exceeds the aperture value. In the present invention a parameter must change value by more than a preceeding stored sample aperture, and then the algorithm stores only the peak or valley extreme in a variable frame. The algorithm places the aperture tolerance around the stored peak or valley sample and the process continues.

In the peak and valley search algorithm, the DAU processor (49, FIG. 1) sample information on the parameter signal slope between the peak and valley extremes. The sampled slope information is stored in a variable frame only following exceedance of the parameter from the aperture window. In FIG. 8, following detection of valley 188 at $t_1$, succeeding samples are scanned to detect a succeeding peak. The sampled values indicate an aperture exceedance at time $t_2$. The algorithm monitors the slope, and at a selected accrual value, i.e. an increment magnitude 190 above the threshold limit 184, the processor stores a data sample 192 to provide slope information for later reconstructive data plots. In the preferred embodiment only one slope sample is stored, although additional samples may be stored if desired. The algorithm continues to search for a peak, which occurs at $t_4$ with the peak 194. This peak, having exceeded the aperture threshold 184, is stored in a variable frame and the aperture window with upper and lower threshold limits 196, 198 is established about the stored sample value 194.

The parameter peak and valley excursions remain within the aperture between the $t_4$ time of peak 194 and time $t_5$, when the parameter exceeds the lower limit 198. A slope sample 200 is stored, as is the next succeeding valley sample 202 at time $t_6$. The aperture is now set with limits 204, 206 about the stored sample 202, and the peak and valley search continues for exceedances.

This combination compression process involving a ZOFA compression together with the peak and valley search compression results in a significant reduction of permanent data storage requirements; with preserved accuracy of information. The phantom waveform 208 illustrates the reconstructed data for waveform 180 based on the three stored data samples. As shown, the straight line approximation of the decompression algorithm accurately reflects the extreme values in the parameter waveform while eliminating the insignificant peak and valley perturbations. The two stored slope values can be used to generate a more accurate reconstructed data plot if the inaccuracies shown in FIG. 8 are unacceptable. This reconstruction is achieved by using a linear approximation from data sample 202 through slope sample 200 intersecting the phantom waveform. Similarly the rising slope is reconstructed by drawing a straight line from pseudo data sample 188 through slope sample 192 to intersect the phantom waveform 208.

Both the compressed Type III and IV data are stored in the DFDAU auxiliary memory unit (AMU) 58 (FIG. 1). Each type of compressed data is written into the AMU under the control of the DFDAU processor 49 under an AMU read-write control function. This function interlaces the two types of compressed data for storage in the AMU in such a manner as to allow the data to be separated after ground readout for processing.

Figure 9:
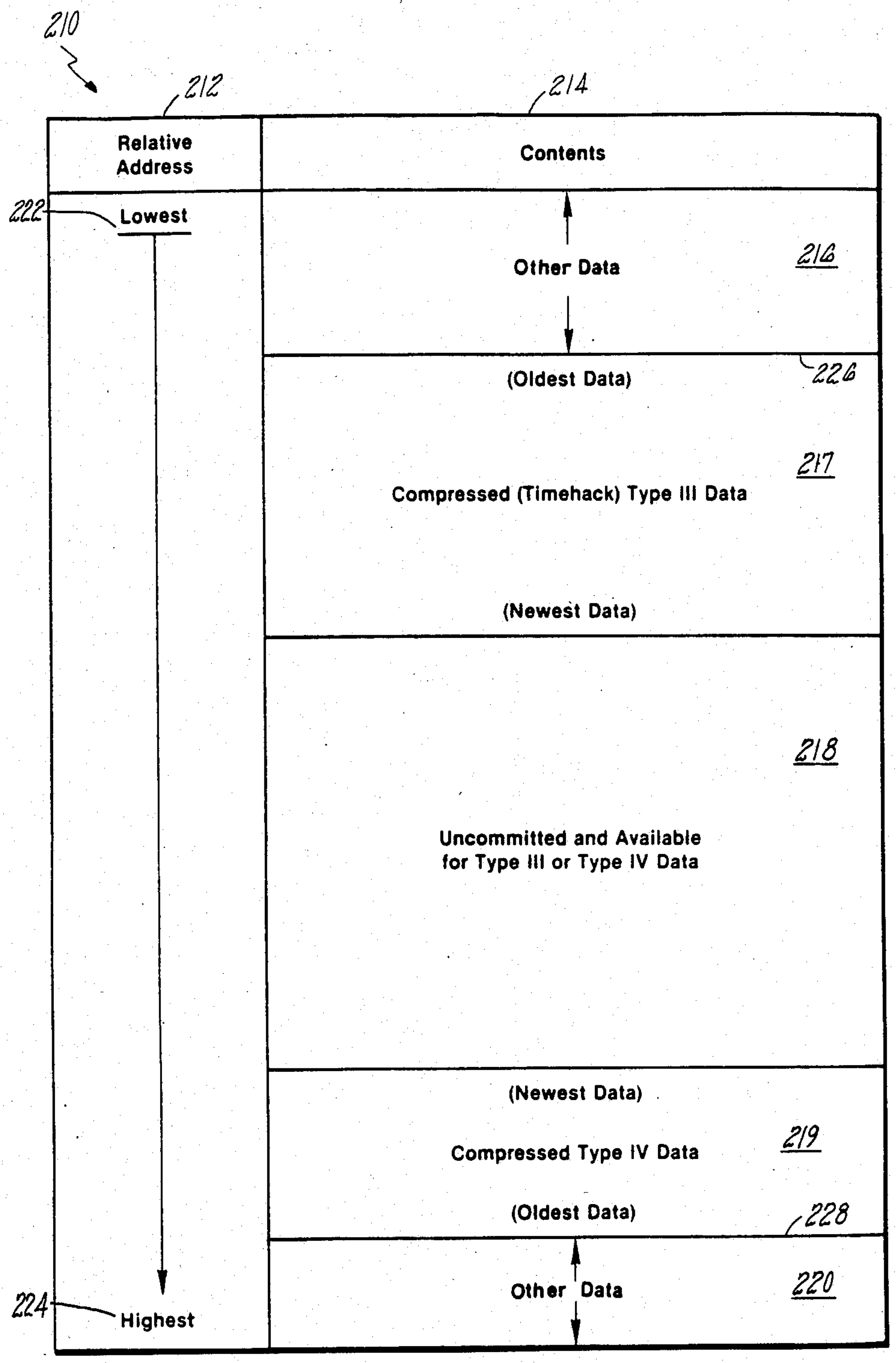
FIG. 9 is a diagram of a memory map illustrating a last aspect of the present invention.

To accomplish this, the AMU is memory mapped into fixed physical areas for storage of the various types of data required to be stored by the AMU. This includes Types III and IV data, and "other data" related to DFDAU operation. FIG. 9 illustrates the AMU memory map 210 with address column 212 and address locations (memory content) 214 for data storage. Preferably, the memory is divided into segments 216–220, from the lowest address 222 to the highest address 224. Segments 216, 220 are relegated to other data storage. The remaining three are dedicated to the Types III and IV data. The Type III and IV segments 217, 219 have minimum reserved storage, approximately one flight's worth of data. Each, however, are at opposite extremes of the AMU memory address and bound the middle segment 218. The Type III data segment 217 begins data storage at a lower, first boundary address 226, and Type IV data segment 219 begins data storage at a higher, second boundary address 228. Each data type is written in real time sequence from the beginning boundary addresses toward the middle segment 218, which is available for both Type III or IV data storage as needed following overflow of the minimum reserve of each. The minimum reserve prevents complete overwrite of one type by the other in the event that data is not unloaded. In this case the overflow data will overwrite the oldest data of the same type, i.e. begin back at boundary address. Typically the DFDAU will provide an indication when 80 percent or more of the middle segment is used.

The read-write control uses several techniques for error control when storing data in the AMU. To protect against hard memory failures, a read-after-write check is performed on each word written to the AMU. If the read-after-write test indicates a problem, the AMU read/write control will rewrite the word and try again to read it. The process continues for some number of tries to preclude short term anomalies. If, after repeated attempts, the data cannot be successfully written to a given location, the location is mapped out of the AMU address space and the data is written to a next location.

A second error control measure is to append a cyclic redundancy check code to each block of data written into the AMU. If a long term fault develops, the ground processor will know that the data for that block is faulty and will ignore it. Although this does not provide error correction capability, it does provide significant detection capability with only a small memory overhead penalty. Error correction codes would significantly increase the memory overhead while providing only minimal additional benefits. In the DFDAU recording system of FIG. 1, loss of one block of data is inconsequential in the final analysis and ground reconstruction of the data.

The various aspects of the present invention all relate to improved accuracy and reliability in providing real time signal compression, storage, and data readout of sampled flight parameters. In particular, the Type III real time compression technique, in situ, with compressed data storage in solid-state memory, provides a signal compression function not available in prior art recording systems. The eight state load data compression algorithm is performed without ground assistance, on the fly, making the storage of the loads data in solid-state memory feasible. It is possible, with adjustment of upper and lower threshold limits, e.g. set lower threshold above upper threshold to cause the eight state algorithm to degenerate into a four state (0–3) upper threshold search. This has the advantage of preserving a greater number of data samples, but of course less compression.

The compression algorithm associated with the Type IV engine data is a combination of peak and valley search routines used in the loads application, together with a known ZOFA compression algorithm. Together, the two provide a significant increase in compression ratio values, further reducing memory storage requirements or, alternately, increasing flight time for available memory storage. Finally, the technique of writing the two types of compressed data into memory; beginning at opposite ends of two address extremes in the memory and allowing the accrued sampled data stored from each type to approach a common central memory region, this allows consumption of the uncommitted memory location to be used on an as required basis, i.e. by the higher frequency type data. This frequency of usage may vary from flight-to-flight. Therefore, this technique provides for a flexible allocation of memory space, without having to make a definite commitment up front to surplus or insufficient memory space.

Although the present invention has been shown and described with respect to a best mode embodiment thereof, it should be understood by those skilled in the art that the foregoing and various other changes, omissions, and additions in the form and detail thereof may be made therein with departing from the spirit and scope of the invention.

APPENDIX I

8 STATE ALGORITHM CONDITION-ACTION RULES

| STATE | CONDITION | ACTION |
|---|---|---|
| 0 Upper threshold better valley search; valley detected. | Lower threshold not exceeded. | Action 02: If this valley is less than the potential valley, then this valley becomes the new potential valley. Go to state 2. |
| | Lower threshold is exceeded. | Action 05: If this valley is less than the potential valley, then this valley becomes the new potential valley. The potential valley becomes the new potential peak and the potential peak becomes the new potential valley. Lower threshold detection is entered. Go to state 5. |
| 1 Upper threshold better peak search; valley detected. | Lower threshold not exceeded, and the valley criteria not met. | Action 13; If this valley is less than the potential valley, then this valley becomes the new potential valley. Go to state 3. |
| | Lower threshold is exceeded. | Action 15: Store the time hack and snapshot for the potential peak. This valley becomes the new potential peak and the old potential peak becomes the new potential valley. Lower threshold detection is entered. Go to state 5. |
| | Lower threshold not exceeded and the valley criteria met. | Action 12: Store the time hack and snapshot for the potential peak. This valley becomes the new potential valley and the new potential peak. Go to state 2. |
| 2 Upper threshold better valley search; peak detected. | The peak criteria met. | Action 21: Store the time hack and snapshot for the potential valley. This peak becomes the new potential peak and the new potential valley. Go to state 1. |
| | The peak criteria not met. | Action 20: If this peak is greater than the potential peak, then this peak becomes the new potential peak. Go to state 0. |
| 3 Upper threshold peak search; peak detected. | In any case. | Action 31: If this peak is greater than the potential peak, then this peak becomes the new potential peak. Go to state 1. |
| 4 | Upper | Action 46: If this valley is greater |

APPENDIX I-continued

8 STATE ALGORITHM CONDITION-ACTION RULES

| STATE | CONDITION | ACTION |
|---|---|---|
| Lower threshold valley search; valley detected. | threshold not exceeded. | than the potential valley, then this valley becomes the new potential valley. Go to state 6. |
| | Upper threshold is exceeded. | Action 41: If this valley is greater than the potential valley then this valley becomes the new potential valley. The new potential valley becomes the new potential peak and the old potential peak becomes the new potential valley. Upper threshold detection is entered. Go to state 1. |
| 5 Lower threshold better peak search; valley detected. | Upper threshold not exceeded, and the valley criteria not met. | Action 57: If this valley is greater than the potential valley, then this valley becomes the new potential valley. Go to state 7. |
| | Upper threshold is exceeded. | Action 51: Store the time hack and snapshot for the potential peak. This valley becomes the new potential peak and the new potential valley. Upper threshold detection entered. Go to state 1. |
| | Upper threshold not exceeded, and the valley criteria met. | Action 56: Store the time hack and snapshot for the potential peak. This valley becomes the new potential valley and the new potential peak. Go to state 6. |
| 6 Lower threshold better valley search; peak detected. | The peak criteria met. | Action 65: Store the time hack and snapshot for the potential valley. This peak becomes the new potential peak and the new potential valley. Go to state 5. |
| | The peak criteria not met. | Action 64: If this peak is less then the potential peak, then this peak becomes the new potential peak Go to state 4. |
| 7 Lower threshold peak search; peak detected. | In all cases. | Action 75: If this peak is less (more negative) than the potential peak, then this peak becomes the new potential peak. Go to state 5. |

What is claimed:

1. The method of recording periodic real time sampled values of a parameter signal for reconstruction of the parameter real time waveform, comprising the steps of:

storing each real time sample value in a preliminary signal storage medium for a fixed real time interval;

identifying as fixed recording samples, periodic ones of said real time sample value stored in said preliminary signal medium at spaced real time intervals equal to said fixed interval, and identifying all samples intermediate to said fixed recording samples as variable recording samples;

detecting each of said variable recording samples having sample value which represent an extreme deviation from a selected threshold value; and recording said fixed recording samples in real time in a permanent signal storage medium, and recording each of said extreme deviation variable recording samples in real time in said permanent signal medium intermediate to said fixed recording samples, whereby the locus of recorded values of said fixed recording samples and said extreme deviation variable recording samples represent the reconstructed real time waveform of the parameter signal.

2. The method of claim 1, wherein the step of detecting said extreme deviation variable recording samples includes the steps of:

monitoring all sample values stored in said preliminary signal storage medium;

comparing each sample value with a preceding sample value to determine relative difference signal value therebetween, and comparing each sample value with a reference value to determine an absolute difference signal value therebetween; and designating as an extreme deviation variable recording sample each sample having said relative difference signal value greater than a desired relative value and having said absolute difference signal value greater than a desired absolute value.

3. The method of claim 2, wherein said step of detecting further includes:

representing each said designated extreme deviation variable recording sample having an actual value greater than that of a preceding extreme deviation sample as a potential waveform peak and representing each said designated extreme deviation variable recording sample having an actual value less than that of a preceding extreme deviation sample as a potential waveform valley; and recording in aid permanent signal storage medium those of said designated extreme deviation variable recording samples represented as said potential waveform peaks and said potential waveform valleys.

4. The method of claims 1 or 3, further comprising the steps of:

defining a desired aperture tolerance for said fixed recording samples and said variable recording samples;

assigning said desired aperture tolerance to the eariliest fixed recording sample;

comparing succeeding recorded samples with said earliest fixed recording sample to detect, as an exceedance sample, the first succeeding recorded sample having an actual value which exceeds said desired aperture tolerance;

continuing said step of comparing succeeding recorded samples with said first exceedance sample to determine the next succeeding recorded sample having a value which exceeds said first exceedance sample aperture tolerance, and so continuing until all recorded samples have been so compared; and discarding all recorded samples other than said exceedance sample.

5. Apparatus for recording periodic real time samples values of a parameter signal provided by a signal source, for reconstruction of the parameter real time waveform, comprising:

recording means, for receiving fixed sample signals and extreme deviation sample signals, and for storing each in a non-volatile medium for subsequent retrieval; and signal processing means, responsive to said signal source for periodically sampling the parameter signal to provide real time sampled value signals thereof, and including program memory means for storing program indicative of a signal processing compression algorithm, and including data memory means for storing the sampled value signals, said signal processing means:

storing each real time sample value in said data memory means for fixed real time interval, said processing means presenting one stored sample signal from each said fixed interval as said fixed sample signals to said recording means, said processing means identifying all sample signals stored intermediate to said fixed sample signals as variable sample signals, and selecting those of said variable sample signals having value which represent an extreme deviation from a selected threshold value, and presenting such selected sample signals as said extreme deviation sample signals to said recording means for recording therein intermediate to said fixed sample signals.

6. The apparatus of claim 5, wherein said processing means selects said extreme deivation sample signals from said variable sample signals by comparing each stored variable sample value with the immediately preceding stored sample value thereof to determine a relative difference signal value, and by comparing each stored variable sample value with a reference value to determine an absolute difference signal value, said processing means selecting as said extreme deviation sample signals each variable sample signal having a relative difference signal value and an absolute difference signal value greater than corresponding desired values.

7. The apparatus of claim 6, wherein said processing means further identifies each said extreme sample signal having an actual value greater than that of a preceding extreme deviation sample as a potential waveform signal peak, and identifies each extreme deviation sample having an actual value less than that of a preceding extreme deviation sample as a potential waveform signal valley, and wherein said processing means presents only those of said selected extreme deviation samples which are further identified as said potential waveform peak signals and said potential waveform valley signals to said recording means for recording therein.

8. The apparatus of claim 5, wherein said signal processing means compares said extreme deviation sample signals within each fixed interval with the interval fixed sample signal, to detect as an exceedance variable sample the first extreme deviation sample signal in said fixed interval having an actual value greater than said fixed sample signal by a selected aperture tolerance, said processing means, in the presence of such said exceedance variable sample, next comparing each succeeding extreme deviation sample signal in said fixed interval with a preceding detected exceedance variable sample to detect the next extreme deviation sample signal having an actual value greater than said prededing exceedance variable sample by said selected aperture tolerance, and to continue so on to detect all extreme deviation samples in said fixed internal having values greater than said preceding exceedance variable sample by said aperture tolerance, said processing means presenting each said extreme deviation sample detected as an exceedance variable sample to said recording means.

9. Apparatus for recording the periodic real time sample values of a set of aircraft flight parameter signals associated with aerodynamic loading of an aircraft during aircraft maneuver, comprising:

recording means, for recording in real time in a non-volatile medium, fixed sample signals and variable sample signals; and signal processing means, including program memory means for storing a program and data memory means for storing the real time sample value signals, said program memory including an algorithm defining a signal compression routine to be performed by said signal processing means on the sampled value signals, said processing means:

monitoring less than all of the set of samples value signals to detect the occurrence of an actual value of any of said monitored sampled value signals which exceed a corresponding reference value therefor, and for providing a maneuver signal in the presence of such occurrence, storing in said data memory means all the real time sample value signals of the whole set of parameter signals received in a fixed real time interval in the presence of said maneuver signal, selecting at least one set of said real time sample value signals stored in said data memory means in each fixed interval as said fixed sample signals for presentation to said recording means, and detecting those sets of real time sample signals intermediate to said selected fixed sample signals having values indicative of an extreme deviation from a selected threshold value, as said variable sample signals for presentation to said recording means, whereby said fixed sample signals and said variable sample signals are stored in said recording means, in combination, to provide the locus of the real time waveform of the flight parameter signals for subsequent real time analysis.

10. The apparatus of claim 9, wherein said processing means determines those of said intermediate sample signals having values indictive of an extreme deviation, by comparing the actual value of a present intermediate sample signal with the actual value of a preceding intermediate sample signal to determine a relative difference signal value, and by comparing the actual value of said present intermediate sample signal with a reference value therefor to determine an absolute difference signal value, said processing means designating as an extreme deviation those intermediate sample signals having both a relative difference signal value and an absolute difference signal value greater than corresponding desired values.

11. The apparatus of claim 10, wherein said signal processing means further identifies each said detected extreme deviation of an intermediate sample signal as a potential waveform peak in response to a present extreme deviation sample signal having an actual value greater than that of a first preceding extreme deviation sample signal, and identifies as a potential waveform valley each present extreme deviation sample signal having an actual value less than that of a second preceding extreme deviation sample signal, and for selecting said potential waveform peak sample and said potential waveform valley sample for presentation as said variable sample signals to said recording means.

* * * * *

UNITED STATES PATENT AND TRADEMARK OFFICE
CERTIFICATE OF CORRECTION

PATENT NO. : 4,646, 241

DATED : February 24, 1987

INVENTOR(S) : Michael Ratchford, Richard E. Versailles, Edward R. Brown

It is certified that error appears in the above-identified patent and that said Letters Patent is hereby corrected as shown below:

Claim 1, column 16, line 52, "value" should read --values--.

Claim 1, column 16, line 58, "value" should read --values--.

Claim 2, column 17, line 7, after "determine" insert --a--.

Claim 4, column 17, line 36, "earili" should read --earli--.

Claim 5, column 17, line 51, "samples" should read --sampled--.

Claim 5, column 17, line 68, after "for" insert --a--.

Claim 5, column 18, line 8, "value" should read --values--.

Claim 7, column 18, line 27, after "extreme" insert --deviation--.

Claim 8, column 18, line 50, "prededing" should read --preceding--.

Claim 8, column 18, line 53 "internal" should read --interval--.

Claim 9, column 18, line 59, "sample" should read --sampled--.

Claim 9, column 19, line 4, "samples" should read --sampled--.

Signed and Sealed this

Twelfth Day of March, 1991

*Attest:*

HARRY F. MANBECK, JR.

*Attesting Officer*

*Commissioner of Patents and Trademarks*